United States Patent [19]

Warkotsh

[11] Patent Number: 4,531,872
[45] Date of Patent: Jul. 30, 1985

[54] QUICK ACTION TENSIONING NUT

[76] Inventor: Horst Warkotsh, Schulstr. 36/Post Box 1244, D-3006 Burg Wedel 3/Hann., Fed. Rep. of Germany

[21] Appl. No.: 393,319

[22] Filed: Jun. 29, 1982

[30] Foreign Application Priority Data

Jul. 11, 1981 [DE] Fed. Rep. of Germany ....... 3127521

[51] Int. Cl.³ .............................................. F16B 37/08
[52] U.S. Cl. ..................................................... 411/433
[58] Field of Search ............... 411/433, 432, 434, 437, 411/427; 24/502, 503, 504, 505, 506; 73/460, 487; 301/9 CN, 9 DH

[56] References Cited

U.S. PATENT DOCUMENTS

| 1,001,042 | 8/1911 | Kadel | 411/433 |
| 1,550,173 | 8/1925 | Lamar | 403/282 |
| 2,976,012 | 3/1961 | Allen | 411/432 X |
| 3,041,088 | 6/1962 | Brandon | 411/432 X |
| 4,343,496 | 8/1982 | Petranto | 411/433 X |

FOREIGN PATENT DOCUMENTS

| 2807343 | 8/1978 | Fed. Rep. of Germany . |
| 2935216 | 3/1981 | Fed. Rep. of Germany . |
| 561892 | 8/1923 | France | 411/433 |
| 47-20530 | 6/1972 | Japan | 411/433 |
| 72788 | 11/1947 | Norway | 411/433 |
| 241155 | 3/1967 | U.S.S.R. | 411/433 |

Primary Examiner—Gary L. Smith
Assistant Examiner—Adrian H. Whitcomb, Jr.
Attorney, Agent, or Firm—Allegretti, Newitt, Witcoff & McAndrews

[57] ABSTRACT

A quick action tensioning nut of the type used to fasten a vehicle wheel on the mounting shaft or axle of a wheel balancing machine. The quick action tensioning nut has at least one pre-tensioned, somewhat semi-circular and radially movable thread segment which is mounted rotatably in the body of the nut. The thread segment is rotatable around an axis of rotation that is parallel to the mounting shaft, and the axis of rotation for the thread segment penetrates the fixed end of the thread segment. The nut also has a thread segment locking mechanism that locks the thread segment in a tightened state on the shaft. In order to release the thread segment from the tightened state, the end of the thread segment opposite the fixed end has a recess into which a thrust member can penetrate to rotate the thread segment away from locking engagement with the mounting shaft. The thread segment is constantly urged to rotate radially inwardly toward the mounting shaft by means of a spring. An adjustable locking device adjustably locks the thread segments in place with respect to the body of the nut.

17 Claims, 15 Drawing Figures

QUICK ACTION TENSIONING NUT

CROSS-REFERENCE TO RELATED APPLICATION

Priority is claimed under 35 U.S.C. S119 based upon application Ser. No. P 31 27 521.4, filed on July 11, 1981 in the Federal Republic of Germany.

BACKGROUND OF INVENTION

The invention relates to a quick action tensioning nut. More particularly, this invention relates to a quick action tensioning nut for fastening a wheel to the mounting shaft of a wheel balancing machine.

As disclosed in German Patent OS No. 28 07 343, quick action tensioning devices have been used in the past to fasten vehicle wheels to the threaded axles of wheel balancing machines. The specific device disclosed in German Patent OS No. 2807 343 has a rather long, tubular base body, which is moveable on the axle of a balancing machine, and two handles mounted on the tubular body. The tubular body has two, diametrically opposed, axially extending openings, in each of which is mounted a spring-loaded lever. The sides of the levers facing the axle are provided with teeth that mate with the threads on the axle. In the normal, locked state, the springs of the spring-loaded levers press the teeth of the levers into locking engagement with the thread of the axle. By simultaneously actuating the two levers, the levers disengage the threads from the axle so that the quick action tensioning device can be moved on the axle.

The device shown in German Patent OS No. 28 07 343 thus requires at least two fingers of the hand to actuate and unlock the levers. Moreover, the device in German Patent OS No. 28 07 343 cannot be used with an axle having a diameter greater than 38 mm since the fingers of a single human hand cannot reach both levers simultaneously if the axle's diameter is greater than 38 mm. Furthermore, the tensioning device of German Patent OS No. 28 07 343 is bulky, having a large axial length because of the large housing required for the spring loaded levers, and the device requires that the axle or spindle of the balancing machine be large enough to properly engage the device.

German Patent OS No. 29 35 216 shows another quick action tensioning device for fastening a wheel of a vehicle to the mounting shaft of a wheel balancing machine. Here again, this device has a rather long, tubular body, in which, on the side of the body opposite the balancing machine, two openings are formed. Spring loaded pivot levers are seated in these openings. The pivot levers also have thread segments on the sides of the levers facing the axle. The thread segments mate with the threads on the axle of the balancing machine. On the sides of the levers opposite the axle-facing sides, the levers engage one another so that actuation of any one lever results in the simultaneous actuation of the other. Upon actuating one or the other lever, the quick action tensioning device of German Patent OS No. 29 35 216 is moved out of engagement with the axle or spindle of the balancing machine.

The device shown in German Patent OS No. 29 35 216 is also bulky, having a large axial length as a result of the size of the housing for the pivoting levers, their axial length, and their radial pivotability.

It is therefore an object of the present invention to provide a quick action tensioning device that is less bulky and smaller in axial length than the devices in the prior art.

It is also an object of the present invention to provide a quick action tensioning device that can be employed on a wide variety of kinds of threads.

Yet another object is to provide a quick action tensioning device that is easily to manipulate and that can be disengaged or unlocked with only one hand.

It is a further object to provide a quick action tensioning nut that can be easily and inexpensively manufactured.

There are other objects and advantages of the present invention. They will become apparent as the specification proceeds.

SUMMARY OF THE INVENTION

The objects and advantages disclosed are attained by my invention of a quick action tensioning nut having a body, a central passage passing through the body, at least one thread segment, at least one segment axis of rotation parallel to the passage axis, a thread segment loading mechanism, and threat segment locking device. The central passage has a passage axis, and the thread segment is pivotally mounted in the body about the segment axis of rotation so that the thread segment is moveable both radially inwardly toward, and outwardly from, the passage axis of the central passage. The thread segment loading mechanism constantly urges the thread segment to rotate about the segment axis of rotation radially inwardly toward the passage axis. The thread segment locking device adjustably secures the thread segment in position with respect to the passage axis.

BRIEF DESCRIPTION OF THE DRAWINGS

In the accompanying drawings, several preferred embodiments of the present invention are illustrated wherein.

DESCRIPTION OF THE PREFERRED EMBODIMENTS

As shown in FIGS. 1A, 2A, 3A, 4A and 5A, the quick action tensioning nuts 2 of the preferred embodiments each have a circular base body 4, handles 6 and 8 extending radially outwardly from the base body 4, and a circular thrust member 10, much like a fly nut, fastened to an axial end of the base body 4. The thrust member 10 can receive a mounting cap (not shown). The base body 4 has a base flange ring 12 extending radially inwardly on the axial end of the base body 4 opposite the thrust member 10. The thrust member 10 has a thrust flange ring 14 extending radially outwardly from thrust member 10. The thrust flange ring 14 abuts the base body 4. The thrust member 10 has a central passage 16 with a diameter that is equal to the inside diameter of the flange ring 12 and that is equal to, or slightly greater than, the outside diameter of the thread (not shown) of the axle or mounting shaft of a balancing machine on which the nut 2 will be used.

The base body 4 and the thrust member 10 bound a tubular cavity 18 with the base flange ring 12 bounding one end of the cavity 18 and the thrust flange ring bounding another end of the cavity 18. Within the portion of the cavity 18 bounded only by the base body 4, two nearly semicircular thread segments 20 and 22 are arranged. The interior, radially inwardly facing threads 24 and 26 on the thread segments 20 and 22 can be brought into engagement with the thread (not shown) of the mounting shaft or axle of the balancing machine.

As shown in FIGS. 1B, 1C, 2B, 2C, 3B, 3C, 4B, 4C, 5B, and 5C, each thread segment 20 and 22 is rotatable about a link pin 28 and 30 passing through the thread segments 20 and 22 near their separated ends 32 and 34, respectively. The interior threads 24 and 26 are formed on the portion of the thread segments 20 and 22 extending from the link pins 28 and 30 to the adjacent ends 36 and 38, respectively, on the thread segments 20 and 22, respectively. The adjacent ends 36 and 38 are opposite the separated ends 32 and 34, respectively.

Surrounding the outer circumference of the thread segments 20 and 22 is an inwardly pre-tensioned plate spring 40, which constantly urges the adjacent ends 36 and 38 of the thread segments 20 and 22 to rotate or pivot radially inwardly around the link pins 28 and 30, respectively. In the free, pre-tensioned state, the adjacent ends 36 and 38 almost touch. These ends 36 and 38 are slightly beveled on their radially outward edge, forming a wedge-shaped recess 42 therebetween. The wedge-shaped recess 42 can thus be brought into operational connection with a correspondingly wedge-shaped portion 44 of the thrust member 45, which passes radially outwardly through a radial passage 120 in the base body 4. On the end of the thrust member 45 opposite the wedge-shaped portion 44 of the thrust member 45 is a push button 46. By pressing radially inwardly on the push button 46, the adjacent ends 36 and 38 of the thread segments 20 and 22 are spread apart, thus releasing the grip of the thread segments 20 and 22 on the threads (not shown) of the balancing machine's mounting shaft or axle. In order to prevent the plate spring 40 from moving or sliding into the operating range of the push button 46, locking pins 48 and 50 extend radially outwardly from the outer circumferential surface of the thread segments 20 and 22 near their adjacent ends 36 and 38, respectively, but away from the wedge-shaped recess 42.

As shown for the preferred embodiments shown in FIGS. 1C, 2C, 3C, and 4C, the link pins 28 and 30 are seated in link pin passages in the base lip flange 12 and the body of the thrust member 10. The link pins 28 and 30 are accessible through the link pin passages from the axial end of the base body 4 on which the base ring flange 12 is located.

Figure 1A:
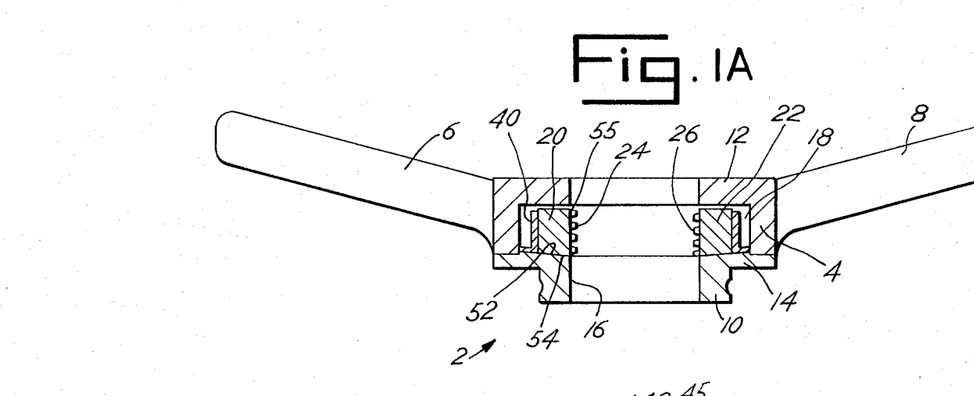
FIG. 1A is a cross-sectional side view of a push-button type quick action tensioning nut having a tensioned spring plate surrounding the thread segments to create locking force.
Figure 1B:
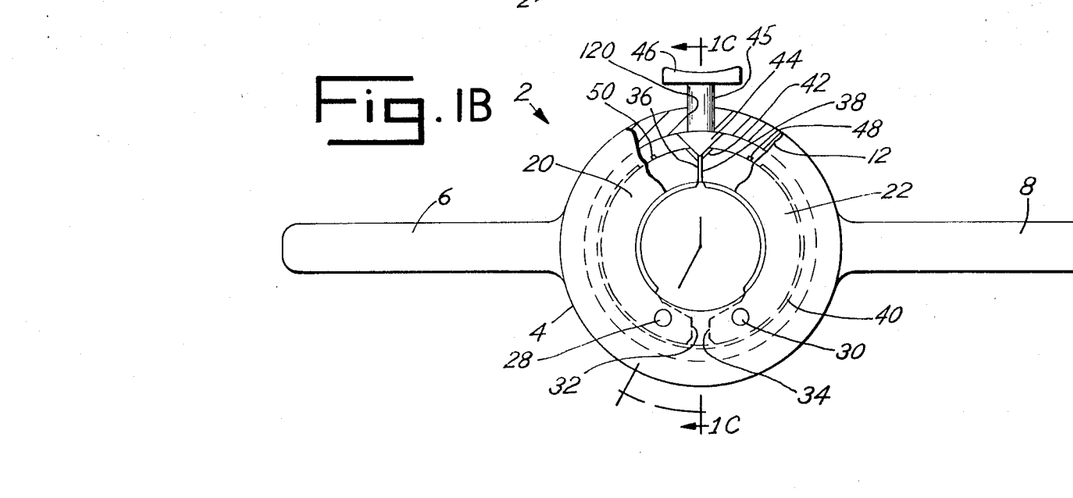
FIG. 1B is a top, partially cross-sectional view of the push-button type quick action tensioning nut shown in FIG. 1A.
Figure 1C:
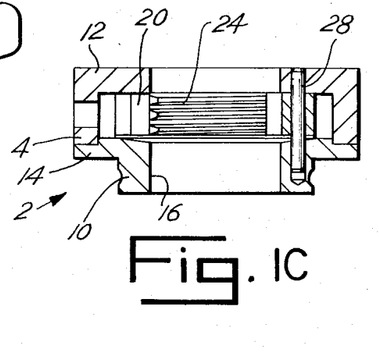
FIG. 1C is a sectional view taken along section line 1C—1C of FIG. 1B.
Figure 2A:
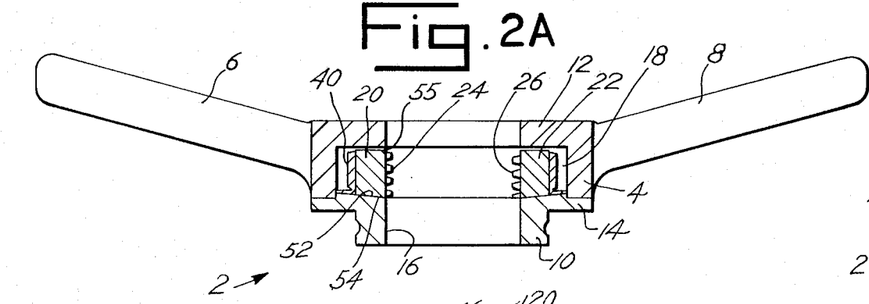
FIG. 2A is a cross-sectional side view of a lever action type quick action tensioning nut.
Figure 2B:
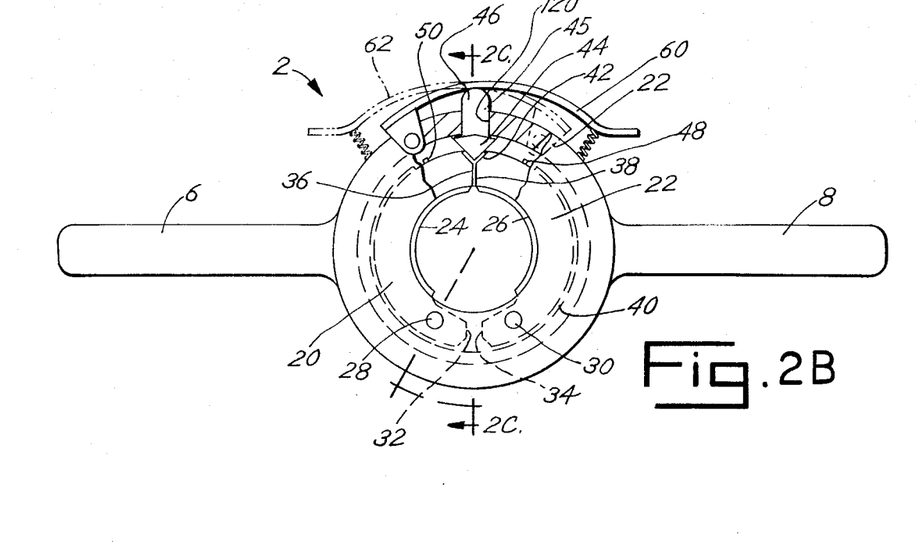
FIG. 2B is a top, partially cross-sectional seam of the lever action type quick action tensioning nut.
Figure 2C:
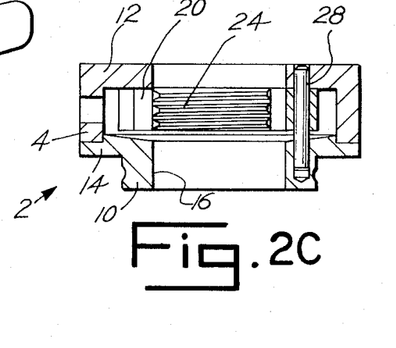
FIG. 2C is a cross-sectional view taken along section line 2C—2C of FIG. 2B.

In the preferred embodiments shown in FIGS. 1 and 2, in order to secure the thread segments 20 and 22 in the tightened or tensioned state, the upper annular hub 52, which is the portion of the thrust member 10 abutting the thread segments 20 and 22, is beveled inwardly and the lower annular hub 54, which is the portion of the thread segments 20 and 22 abutting the upper annular hub 52, is complementarily beveled in order to mate with the upper annular hub 52. A gap 55 between the thread segments 20 and 22 and the base flange ring 12 allows the threads to move axially with respect to the axis of the central passage 16 in the thrust member 12. During tightening of the nut 2, the thread segments 20 and 22 are brought into mating contact with the mounting threads (not shown) of the mounting shaft (not shown), and by gripping the handles 6 and 8 and moving the nut 2 axially with respect to the axis of the central passage 16, the lower annular hub 54 of the thread segments 20 and 22 is brought into intimate contact with the upper annular hub 52 on the thrust member 10. The nut 2 is then tightened on the mounting shaft (not shown) by turning the handles 6 and 8 to force the mounting threads (not shown) to urge the lower annular hub 54 of the thread segments 20 and 22 into temporarily locking engagement with the upper annular hub 52 of the thrust member 10.

The width of the gap 55 is so dimensioned that, after tightening the thread segments 20 and 22 on the mounting shaft (not shown), the thread segments 20 and 22 can still be moved axially in order to loosen the nut 2.

The nut 2 is loosened by first gripping the handles 6 and 8 and turning the handles 6 and 8 in order to loosen the wedge action between the upper 52 and lower annular hubs 54. The handles 6 and 8 are then moved axially in order to force the thread segments 20 and 22 to further penetrate the gap 55, which allows the thread segments to move radially outwardly free of the lower annular hub 54. The push button 46 is then pushed in order to force the thread segments 20 and 22 to rotate outwardly, thus allowing the nut 2 to be removed from the mounting shaft (not shown).

The embodiment shown in FIG. 2 differs from that shown in FIG. 1 in that a lever 60 or two levers 60 and 62 serve to actuate the thrust member 45.

Figure 3A:
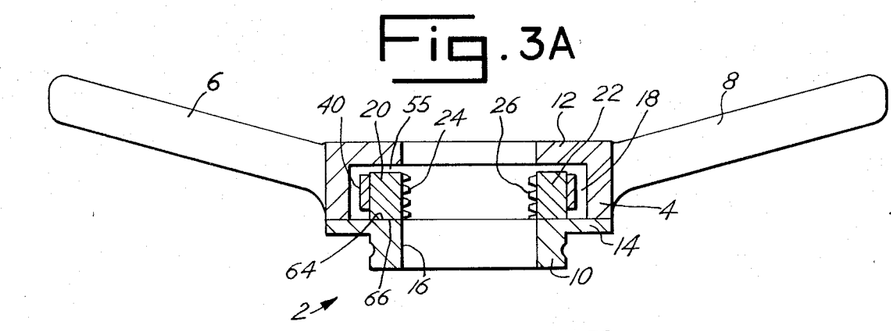
FIG. 3A is a cross-sectional side view of another embodiment of a push-button type quick action tensioning nut utilizing spring actuated rollers to urge the thread segments into locking engagement.
Figure 3B:
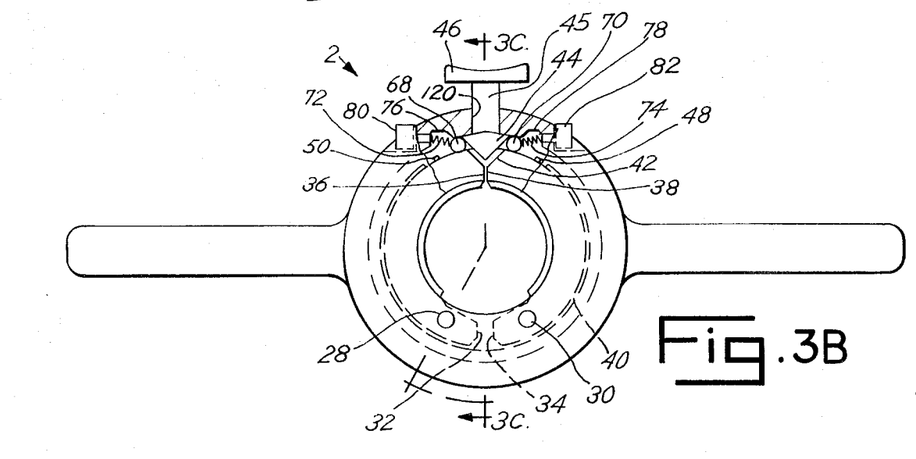
FIG. 3B is a top, partially cross-sectional view of the push-button type quick action tensioning nut shown in FIG. 3A.
Figure 3C:
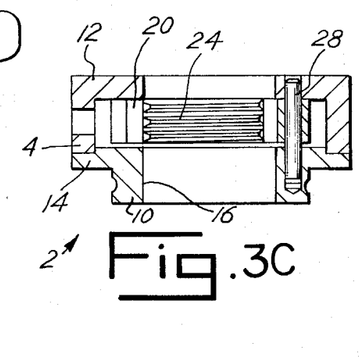
FIG. 3C is a cross-sectional view taken along section line 3C—3C of FIG. 3B.

In the case of the embodiment according to FIG. 3, the upper annular hub 66 and the lower annular hub 64 are not beveled, but rather run perpendicularly to the axis of the central passage 16. In order to secure the thread segments 20 and 22 when locking the nut 2 on the mounting shaft (not shown), rollers 68 and 70 are provided in the vicinity of the wedge-shaped recess 42 and wedge-shaped portion 44 of the thrust member 45 between the exterior circumferential surface of the thread segments 20 and 22 and the interior diametral surface of the base body 4.

When the push button 46 is in its free state, the rollers 68 and 70 abut the surface of the wedge-shaped portion 44 of the thrust member 45. Springs 72 and 74 are seated respectively in inner passages 76 and 78 penetrating the base body 4 so that, when the push button 46 is pressed, the rollers 68 and 70 move along the surface of the wedge-shaped portion 44 of the thrust member 45 outwardly into the inner passages 76 and 78, respectively. Screws 80 and 82 mounted in the inner passages 76 and 78 respectively abut the ends of springs 72 and 74 opposite the rollers 68 and 70, respectively. The force of the springs 72 and 74 against the rollers 68 and 70, respectively, can thus be adjusted by means of the screws 80 and 82, respectively.

When the rollers 68 and 70 are forced to move outwardly into the inner passages 76 and 78, respectively, the thread segments 20 and 22 become free to rotate around the pins 28 and 30, respectively. However, when the push button 46 is in its free state and the rollers are therefore no longer penetrating the inner passages 76 and 78, the thread segments 20 and 22 can serve to lock against the mounting threads (not shown) since outward rotational movement of the thread segments 20 and 22 is prevented by the roller 68 and 70, respectively.

Normally in the case of the embodiment shown in FIG. 3, only one spring, one roller, and one screw will be necessary. This is so because, depending on the direction of turning in order to tighten the nut 2 and the mounting shaft (not shown), only one thread segment need be forced against the mounting threads (not shown).

Figure 4A:
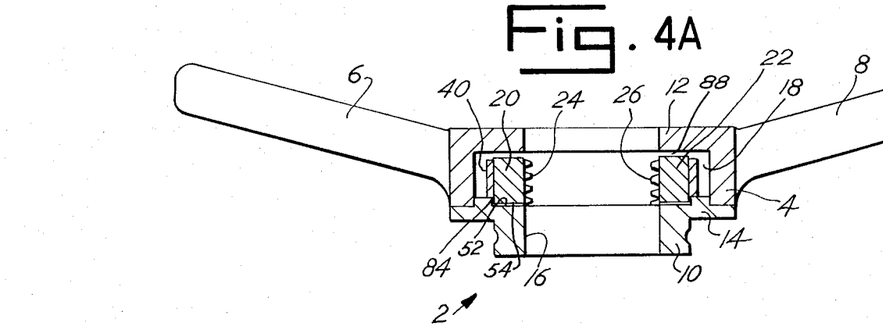
FIG. 4A is a cross-sectional, side view of yet another push-button type quick action tensioning nut having a locking shoulder formed in the hub in order to lock the nut.
Figure 4B:
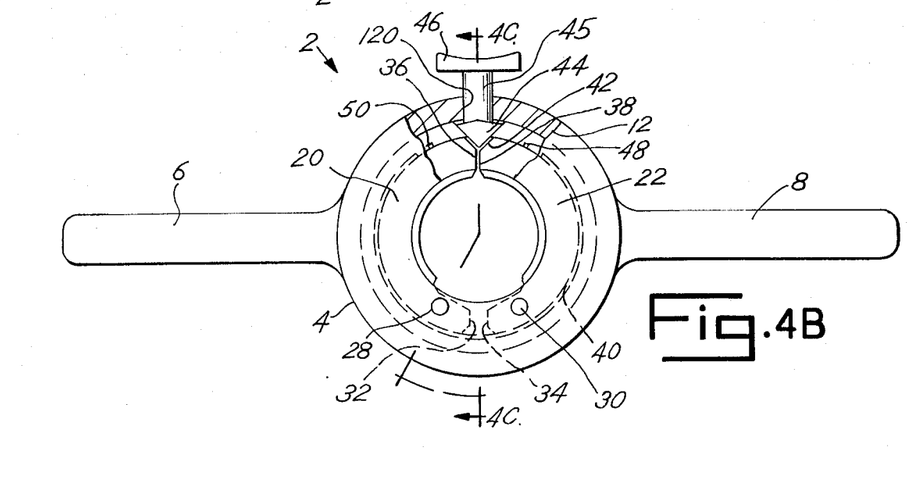
FIG. 4B is a top, partially cross-sectional view of the push-button type quick action tensioning nut shown in FIG. 4A.
Figure 4C:
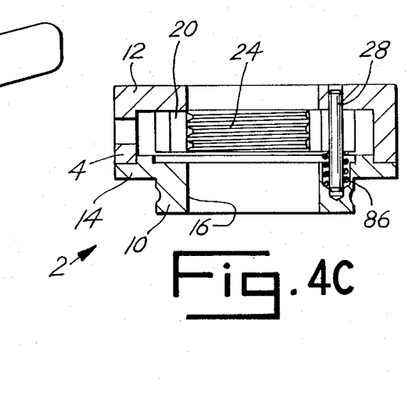
FIG. 4C is a cross-sectional view taken along section line 4C—4C of FIG. 5A.

In the embodiment shown in FIG. 4, the thread segments 20 and 22 are secured against the mounting threads (not shown) by means of an annular shoulder 84 formed in the upper annular hub of the thrust member 10. This shoulder 84 prevents the thread segments 20 and 22 from pivoting outwardly during tightening. In order to release the thread segments 20 and 22 from locking engagement with the mounting thread (not shown), the thread segments 20 and 22 must be moved axially in order to become free of the shoulder 84. As shown for the first link pin 28 and the first thread segment 20, this is accomplished by means of a pressure spring 86 which surrounds the link pins 28 in such a way that, when the thread segments 20 are not in locking engagement with the mounting threads (not shown), the pressure spring 86 forces the thread segment 20 axially away from the shoulder 84. Thus, the width of the gap 88 between the thread segments 20, 22 and the ring flange 12 must at least be greater than the axial depth of the shoulder 84.

Figures 5A, 5C:
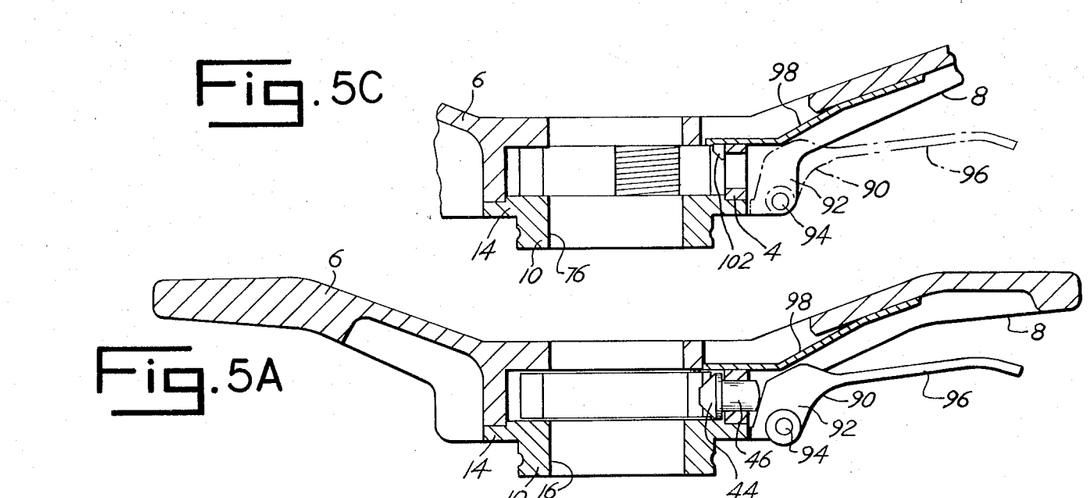
FIG. 5A is a side, cross-sectional view of a handle-lever type quick action tensioning unit.
FIG. 5C is a partial, cross-sectional view, taken along section line 5C—5C of FIG. 5B, in which certain elements have been eliminated for greater clarity.
Figure 5B:
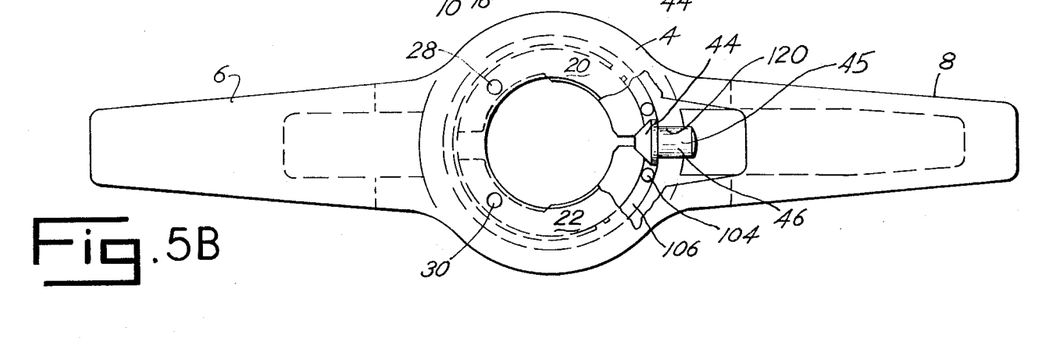
FIG. 5B is top, partially cross-sectional view of the handle-lever type quick action tensioning nut shown in FIG. 5A.

FIG. 5 shows an embodiment that bears a similarity to that of FIG. 2, except that the FIG. 5 embodiment has thread segments 20 and 22 that are shifted by 90° from the embodiment of FIG. 2 so that the push button 46 extends radially outwardly in the direction of one of the handles 8. In addition, instead of the levers 60 and 62 shown in FIG. 2, the FIG. 5 embodiment has a grip 90 that extends radially outwardly from the push button 46, parallel to one of the handles 8. The grip 90 has an actuation arm 96 and a leg 92 that is parallel to the axis of the nut 2. The end of the leg 92 nearest the axis of the nut 2 is pivotally mounted about a peg 94 that is mounted in base body 4 and is transverse to both the axis of the nut 2 and the grip 90.

The leg 92 is adjacent to the push button 46. The actuation arm 96, extending radially outwardly from the leg 92, can thus serve as a lever which, when pulled towards the handle 8, forces the push button 46 radially inwardly.

On the handle 8, a flexible locking plate 98 is fastened. On the free end of the locking plate 98 are two prongs 102 and 104 that penetrate the annular gap 106 between the thread segments 20 and 22 and the base body 4 when the locking plate 98 is in a free, untensioned state. In this free state, the thread segments 20 and 22 are thus prevented from moving radially outwardly by the prongs 102 and 104.

The locking plate 98 lies in the pivoting range of the grip 90, so that, when the actuation arm 96 is pulled toward the handle 8, the two prongs 102 and 104 on the locking plate 98 are pulled out of the annular gap 106 to unlock the thread segments 20 and 22 from locking engagement with the mounting threads (not shown). Further activation of the activation arm 96 urges the leg 92 of the grip 90 against the push button 46. Thus, the wedge-shaped thrust member 44 forces the thread segments to rotate around their respective pins 28 and 30 radially outwardly so that the nut 2 can be freely withdrawn from the mounting shaft (not shown).

Although in the foregoing description there have been described preferred embodiments that attain the advantages and objects set forth herein, the preferred embodiments must be considered simply as illustrative. In this regard, the scope of my invention is indicated by the following claims in view of the preceding description, and the claims are intended to embrace all changes that come within their meaning and range of equivalency.

What is claimed is:

1. A quick action tensioning nut having:
   (a) a body:
   (b) a central passage passing through the body and having a passage axis;
   (c) at least one segment axis of rotation parallel to the passage axis;
   (d) at least one thread segment pivotally mounted in the body about the segment axis of rotation whereby the thread segment is moveable radially inwardly toward and outwardly from the passage axis;
   (e) loading means for pre-tensioning the thread segment so that the thread segment is urged to rotate about the segment axis of rotation radially inwardly toward the passage axis; and
   (f) locking means for adjustably securing the thread segment in position with respect to the passage axis, said locking means including a first annular hub in the thread segment and a second annular hub in the body, said first and second annular hubs cooperatively defining means for preventing movement of the thread segment radially outwardly from the passage axis when the first annular hub is in contact with the second annular hub.

2. The quick action tensioning nut of claim 1 having a thrust member passing through the body to penetrate the central passage and wherein an end of the thread segment defines means for receiving the thrust member whereby the thrust member can urge the thread segment to rotate around the segment axis of rotation radially outwardly from the passage axis.

3. The quick action tensioning nut of claim 2 wherein the thread segment has a first annular hub and the body has a second annular hub and wherein the first and second annular hubs cooperatively define means for preventing movement of the thread segment radially outwardly from the passage axis when the first annular hub is in contact with the second annular hub.

4. The quick action tensioning nut of claim 2 wherein the locking means includes an annular shoulder to prevent movement of the thread segment radially outwardly from the passage axis.

5. The quick action tensioning nut of claim 1 or 2 wherein the body has stop means for limiting the axial movement of the thread segment away from the second annular hub.

6. The quick action tensioning nut of claim 1 having a first and a second thread segment and a first and a second segment axis of rotation, and wherein each thread segment has a first end and a second end opposite the first end and wherein the first segment axis of rotation penetrates the first end of the first thread segment and the second segment axis of rotation penetrates the first end of the second thread segment.

7. A quick action tensioning nut having:
(a) a body;
(b) a central passage passing through the body and having a passage axis;
(c) a first and a second segment axis of rotation, each said segment axis of rotation being parallel to the passage axis;
(d) a first and a second thread segment, each said thread segment being axially moveable with respect to the passage axis and body and having a first end and a second end opposite the first end, the first end of the first thread segment being mounted pivotally about the first segment axis of rotation, and the first end of the second thread segment being mounted pivotally about the second segment axis of rotation whereby each thread segment is moveable radially inwardly toward and outwardly from the central passage.
(e) loading means for pre-tensioning the first and second thread segments so that (i) the first thread segment is urged to rotate about the first segment axis of rotation radially inwardly toward the passage axis and (ii) the second thread segment is urged to rotate about the second segment axis of rotation radially inwardly toward the passage axis; and
(f) locking means for adjustably securing each thread segment in position with respect to the passage axis, said locking means comprising a first annular hub in each thread segment and a second annular hub in the body, the first and second annular hubs cooperatively defining means for preventing movement of the thread segments radially outwardly from the passage axis when the first annular hub ot each thread segment is in contact with the second annular hub.

8. The quick action tensioning nut of claim 7 having a thrust member passing through the body to penetrate the central passage and wherein the second ends cooperatively define means for receiving the thrust member whereby the thrust member can urge the first and second thread segments to rotate around the first and second segment axis of rotation, respectively, radially outwardly from the passage axis.

9. The quick action tensioning nut of claim 7 or 8 wherein the body has stop means for limiting the axial movement of the thread segments away from the second annular hub.

10. A quick action tensioning nut having:
(a) a body;
(b) a central passage passing through the body and having a passage axis;
(c) at least one segment axis of rotation parallel to the passage axis;
(d) at least one thread segment pivotally mounted in the body about the segment axis of rotation wherreby the thread segment is moveable radially inwardly toward and outwardly from the passage axis;
(e) loading means for pre-tensioning the thread segment so that the thread segment is urged to rotate about the segment axis of rotation radially inwardly toward the passage axis; and
(f) locking means for adjustably securing the thread segment in position with respect to the passage axis, the locking means including an annular shoulder in the body to prevent movement of the thread segment radially outwardly from the passage axis.

11. The quick action tensioning nut of claim 10 having a thrust member passing through the body to penetrate the central passage and wherein an end of the thread segment defines means for receiving the thrust member whereby the thrust member can urge the thread segment to rotate around the segment axis of rotation radially outwardly from the passage axis.

12. The quick action tensioning nut of claim 10 or 11 wherein the thread segment is moveable axially away from the annular shoulder and having axial spring means for urging the thread segment to move axially away from the annular shoulder.

13. The quick action tensioning nut of claim 12 wherein the axial spring means includes a pressure spring mounted about the segment axis of rotation.

14. The quick action tensioning nut of claim 12 wherein the axial spring means includes a first and a second pressure spring, the first pressure spring being mounted about the first segment axis of rotation and the second pressure spring being mounted about the second segment axis of rotation.

15. A quick action tensioning nut having:
(a) a body;
(b) a central passage passing through the body and having a passage axis;
(c) a first and a second segment axis of rotation, each said segment axis of rotation being parallel to the passage axis;
(d) a first and a second thread segment, each of said thread segments having a first end and a second end opposite the first end, the first end of the first thread segment being mounted pivotally about the first segment axis of rotation, and the first end of the second thread segment being mounted pivotally about the second segment axis of rotation whereby each thread segment is moveable radially inwardly toward and outwardly from the central passage.
(e) loading means for pre-tensioning the first and second thread segments so that (i) the first thread segment is urged to rotate about the first segment axis of rotation radially inwardly toward the passage axis and (ii) the second thread segment is urged to rotate about the second segment axis of rotation radially inwardly toward the passage axis; and (f) locking means for adjustably securing each thread segment in position with respect to the passage axis, said locking means including an annular shoulder in the body to prevent movement of the thread segments radially outwardly from the passage axis.

16. The quick action tensioning nut of claim 15 having a thrust member passing through the body to penetrate the central passage and wherein the second ends cooperatively define means for receiving the thrust member whereby the thrust member can urge the first and second thread segments to rotate around the first and second segment axis of rotation, respectively, radially outwardly from the passage axis.

17. The quick action tensioning nut of claim 15 or 16 wherein the thread segments are moveable axially away from the annular shoulder and having axial spring means for urging the thread segments to move axially away from the annular shoulder.

* * * * *